(12) United States Patent
Li et al.

(10) Patent No.: US 11,349,300 B2
(45) Date of Patent: May 31, 2022

(54) GROUNDING FAULT PROTECTION METHOD FOR HIGH-VOLTAGE CAPACITOR OF DIRECT-CURRENT FILTER

(71) Applicant: Tianjin University, Tianjin (CN)

(72) Inventors: Yongli Li, Tianjin (CN); Yunke Zhang, Zhoukou (CN); Jinzhao Song, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/245,357

(22) Filed: Apr. 30, 2021

(65) Prior Publication Data
US 2021/0351582 A1 Nov. 11, 2021

(30) Foreign Application Priority Data
May 8, 2020 (CN) .......................... 202010383561.X

(51) Int. Cl.
*H02H 7/16* (2006.01)
*H02H 7/26* (2006.01)
(52) U.S. Cl.
CPC .............. *H02H 7/16* (2013.01); *H02H 7/268* (2013.01)

(58) Field of Classification Search
CPC .............. H02H 7/16; H02H 7/268; H02H 3/16
See application file for complete search history.

(56) References Cited

U.S. PATENT DOCUMENTS

| 4,104,687 | A  | * | 8/1978 | Zulaski | .................... | H02H 3/36 361/88 |
| 10,910,824 | B1 | * | 2/2021 | Jia | ........................... | H02H 7/20 |

* cited by examiner

*Primary Examiner* — Adolf D Berhane
*Assistant Examiner* — Afework S Demisse
(74) *Attorney, Agent, or Firm* — WPAT, PC

(57) ABSTRACT

The invention relates to a grounding fault protection method for a high-voltage capacitor of a direct-current filter. The method comprises the following steps of acquiring a head end voltage u and an unbalanced current $i_{T2}$ of a direct-current filter, and acquiring a discrete head end voltage and unbalanced current sequence; calculating a virtual capacitance $C_{zd}$; determining a protection setting value $C_{set}$ according to the bridge arm capacitance of the high-voltage capacitor, and when the virtual capacitance $C_{zd}$ is larger than the protection setting value $C_{set}$, protecting and judging to be an internal fault; otherwise, protecting and judging to be an external fault.

2 Claims, 2 Drawing Sheets

GROUNDING FAULT PROTECTION METHOD FOR HIGH-VOLTAGE CAPACITOR OF DIRECT-CURRENT FILTER

TECHNICAL FIELD

The invention relates to the field of power system relay protection, in particular to a grounding fault protection method for a high-voltage capacitor of a direct-current filter.

BACKGROUND

High-voltage direct current (HVDC) technology has been widely used in Chinese high-voltage and ultrahigh-voltage power grids due to its advantages of a long transmission distance, large transmission capacity, low loss, and flexible control. In the LCC-HVDC system, the direct-current (DC) filter is configured at both ends of a DC transmission line to filter out the characteristic harmonics injected by a converter to the DC side, effectively avoiding communication interference caused by the characteristic harmonics, heating of DC side power equipment, and electric energy quality reduction as well as other hazards.

As the core component of the DC filter, the high-voltage capacitor bears most of the DC side voltage. After the high-voltage capacitor has a grounding fault, the change of a filter resonant circuit causes the tuning frequency to shift, which not only causes the filtering effect to deteriorate, but also causes the filter components to be damaged due to overcurrent or overvoltage. In actual engineering, differential protection is used to determine various grounding faults of the DC filter, but it is difficult to determine the location of the fault. At the same time, the protection is sometimes affected by the inconsistent transient characteristics of current transformers to cause false action. Therefore, it is of great significance in studying the grounding fault protection of the high-voltage capacitor of the DC filter, improving the reliability and sensitivity of the protection action, and improving the safety and stability of the DC system.

SUMMARY

To solve the problems, the invention discloses a grounding fault protection method for a high-voltage capacitor of a direct-current filter. Based on the virtual capacitance characteristics of the internal and external faults of the high-voltage capacitor, the method constructs the grounding fault protection for the high-voltage capacitor of the DC filter, which not only overcomes the problem of the differential protection that is difficult to determine the fault location, but also uses only single-ended electrical quantity. The technical scheme of the invention is as follows:

A grounding fault protection method for a high-voltage capacitor of a direct-current filter comprises the following steps:

(1) collecting the head-end voltage u and unbalanced current $i_{T2}$ of the DC filter, and obtaining the discrete head-end voltage and unbalanced current sequence $$\begin{cases} u = \{u(1), u(2), \ldots, u(j), \ldots, u(N)\} \\ i_{T2} = \{i_{T2}(1), i_{T2}(2), \ldots, i_{T2}(k), \ldots, i_{T2}(N)\} \end{cases},$$

where j and k, valued as 1, 2, ..., N, are positive integers, and N is a number of total sequence points;

(2) calculating the virtual capacitance $C_{zd}$ with a calculation formula as follows:

$$C_{zd} = \frac{\sum_{k=1}^{N_T} |i_{T2}(k)|}{\sum_{j=1}^{N_T} |u(j+1) - u(j)|}$$

where, $N_T$ is a number of total sampling points within a time window;

and (3) determining a protection setting value $C_{set}$ according to the bridge arm capacitance of the high-voltage capacitor, and when the virtual capacitance $C_{zd}$ is larger than the protection setting value $C_{set}$, protecting and judging to be an internal fault; otherwise, protecting and judging to be an external fault.

Further, the calculation formula of the protection setting value $C_{set}$ is as follows:

$$C_{set} = k_{set} C$$

where, $k_{set}$ is a setting value of protection action, and $k_{set}$ is 0.001-0.05.

To overcome the defects of traditional grounding fault protection for the high-voltage capacitor of the DC filter, the invention discloses a grounding fault protection method for a high-voltage capacitor of a DC filter. Compared with the existing technology, the invention has the following advantages:

(1) Based on the virtual capacitance characteristics of the internal and external faults of the high-voltage capacitor, the invention discloses the grounding fault protection for the high-voltage capacitor of the DC filter, which has a perfect protection theory and has good selectivity.

(2) The method of the invention only uses single-ended electrical quantity, and is not affected by the inconsistent variation of the sensor.

EXPLANATION OF LABELS IN THE FIGURES

Figure 1:
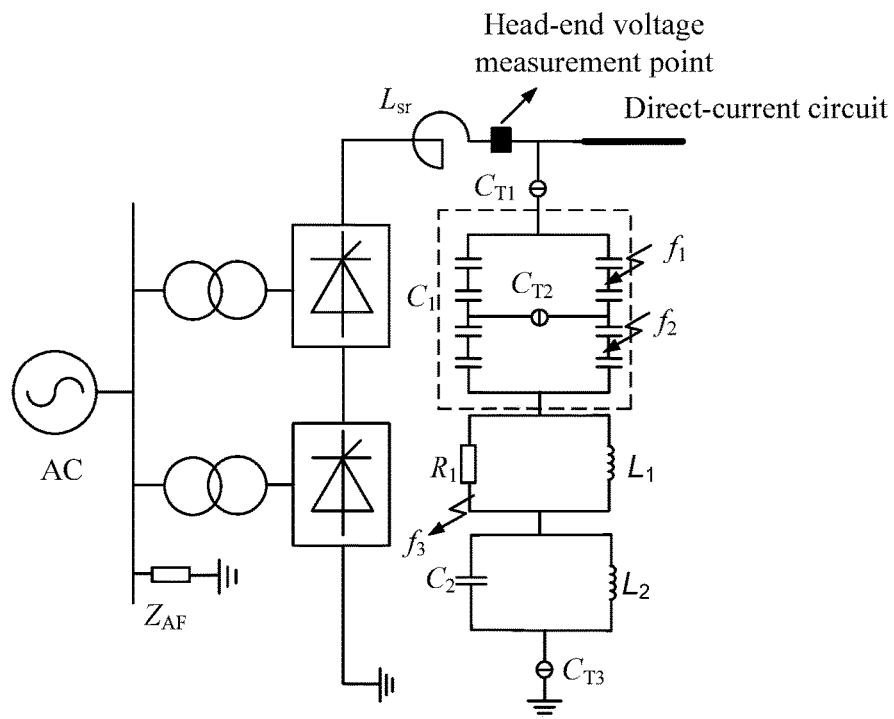
FIG. 1 is a schematic diagram of a HP12/24 direct-current filter.

The DC filter in FIG. 1 consists of a high-voltage capacitor $C_1$, a resistor $R_1$, an inductance $L_1$, a capacitor $C_2$, and an inductance $L_2$; the capacitance of each bridge arm of the high-voltage capacitor $C_1$ is C; $C_{T1}$ and $C_{T3}$ are head and tail current transformers, respectively; $C_{T2}$ is an unbalanced current transformer; $f_1$ and $f_2$ are grounding fault points of the upper and lower bridge arms on the right side of the high-voltage capacitor $C_1$; $f_3$ is the grounding fault point in the area below the high-voltage capacitor; AC is an alternating-current system power supply; $Z_{AF}$ is equivalent impedance of the filter at an alternating-current bus; and $L_{sr}$ is a smoothing reactor.

Figure 2:
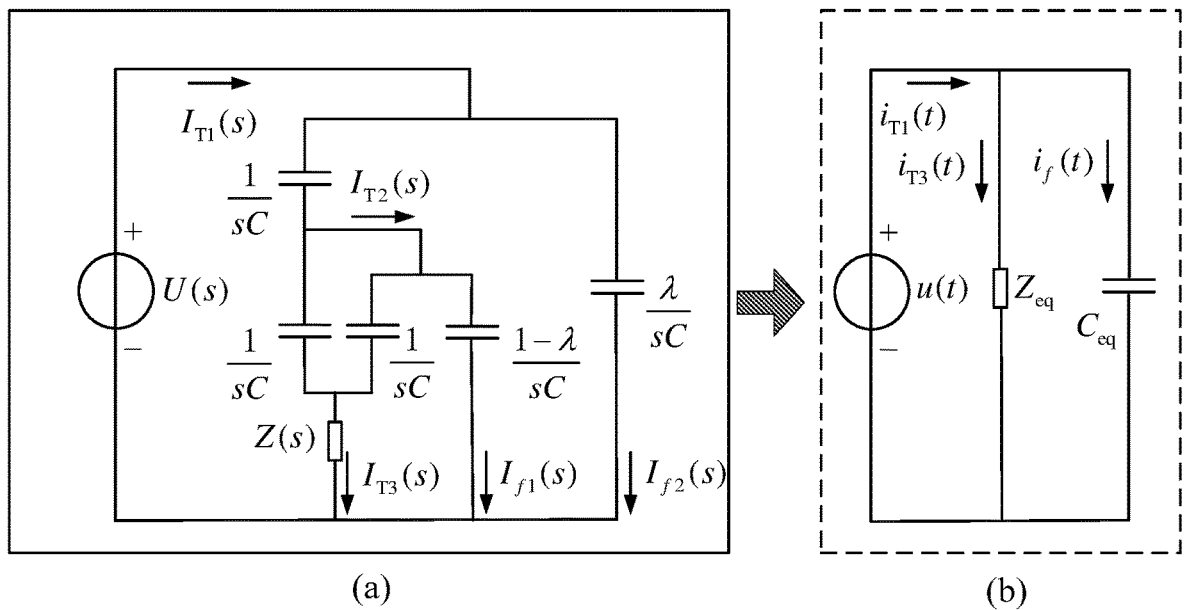
FIG. 2 is a grounding fault equivalent circuit of the upper bridge arm of the high-voltage capacitor.

In FIG. 2, (a) is a grounding fault complex frequency domain equivalent circuit of the upper bridge arm of the high-voltage capacitor; (b) is a grounding fault time domain equivalent circuit of the upper bridge arm of the high-voltage capacitor; U(s) and u(t) are respectively equivalent voltage source in frequency domain and time domain; $I_{T1}(s)$ and $i_{T1}(t)$ are head currents in frequency domain and time domain respectively; $I_{T3}(s)$ and $i_{T3}(t)$ are tail currents in frequency domain and time domain respectively; $I_{T2}(s)$ is the frequency domain unbalanced current; $I_{f1}(s)$ and $I_{f2}(s)$ are the fault current flowing through the capacitance between the top of the upper bridge arm of the high-voltage capacitor and the fault point $f_1$, and the fault current flowing through the capacitance between the fault point $f_1$ and the unbalanced bridge; $i_f(t)$ is the time domain equivalent fault current; $Z(s)$ is the frequency domain equivalent impedance of the components below the high-voltage capacitor; $\lambda$ (0<$\lambda$<1) is percentage of the capacitance C between the top of the upper bridge arm of the high-voltage capacitor and the fault point $f_1$ to the capacitance C of the upper bridge arm on the right; $Z_{eq}$ is the equivalent impedance; and $C_{eq}$ is the equivalent capacitance.

Figure 3:
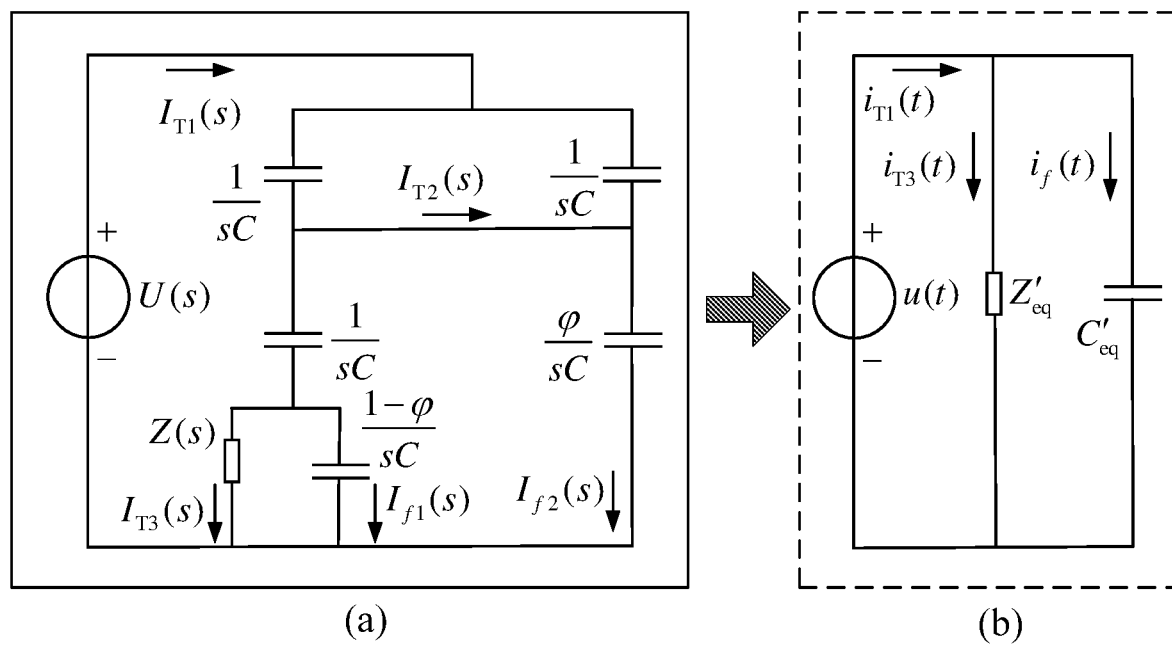
FIG. 3 is a grounding fault equivalent circuit of the lower bridge arm of the high-voltage capacitor.

In FIG. 3, (a) is a grounding fault complex frequency domain equivalent circuit of the lower bridge arm of the high-voltage capacitor; (b) is a grounding fault time domain equivalent circuit of the lower bridge arm of the high-voltage capacitor; U(s) and u(t) are respectively equivalent voltage source in frequency domain and time domain; $I_{T1}(s)$ and $i_{T1}(t)$ are head currents in frequency domain and time domain respectively; $I_{T3}(s)$ and $i_{T3}(t)$ are tail currents in frequency domain and time domain respectively; $I_{T2}(s)$ is the frequency domain unbalanced current; $I_{f1}(s)$ and $I_{f2}(s)$ are the fault current flowing through the capacitance between the tail of the lower bridge arm of the high-voltage capacitor and the fault point $f_2$, and the fault current flowing through the capacitance between the unbalanced bridge and the fault point $f_2$; $i_f(t)$ is the time domain equivalent fault current; $Z(s)$ is the frequency domain equivalent impedance of the components below the high-voltage capacitor; $\varphi$ (0<$\varphi$<1) is percentage of the capacitance C between the unbalanced bridge of the high-voltage capacitor and the fault point $f_2$ to the capacitance C of the lower bridge arm on the right; $Z'_{eq}$ is the equivalent impedance; and $C'_{eq}$ is the equivalent capacitance.

DESCRIPTION OF THE INVENTION

The invention will be described in detail below in conjunction with the drawings and examples.

The grounding fault protection method for the high-voltage capacitor of the direct-current filter disclosed by the invention mainly utilizes virtual capacitance characteristics to realize the discrimination of the internal and external faults of the high-voltage capacitor, and comprises the following specific steps:

(1) as shown in FIG. 1, it is a schematic diagram of a high-voltage DC filter specifically applied in this example. The head-end voltage u and the unbalanced current $i_{T2}$ of the DC filter are collected by a voltage and current collecting device so as to obtain a discrete head-end voltage and unbalanced current sequence $$\begin{cases} u = \{u(1), u(2), \ldots, u(j), \ldots, u(N)\} \\ i_{T2} = \{i_{T2}(1), i_{T2}(2), \ldots, i_{T2}(k), \ldots, i_{T2}(N)\} \end{cases},$$

where j and k, valued as 1, 2, . . . , N, are positive integers, and N is a number of total sequence points.

(2) the virtual capacitance $C_{zd}$ is calculated with a following calculation formula:

$$C_{zd} = \frac{\sum_{k=1}^{N_T} |i_{T2}(k)|}{\sum_{j=1}^{N_T} |u(j+1) - u(j)|}$$

where, $N_T$ is the total number of sampling points within the time window of 5 ms.

and (3) when the virtual capacitance $C_{zd}$ is greater than the protection setting value $C_{set}$, the protection is judged as an area fault; otherwise, the protection is judged as an external fault; the calculation formula of the protection setting value $C_{set}$ is as follows:

$$C_{set} = k_{set} C$$

where, $k_{set}$ is the setting value of protection action, the measurement errors of the voltage transformer and the current transformer are comprehensively considered, $k_{set}$ is 0.001-0.05, and C is the bridge arm capacitance of the high-voltage capacitor.

The virtual capacitance characteristics are utilized to realize the discrimination of the internal and external faults of the high-voltage capacitor with the following principle:

The grounding fault equivalent circuit of the upper bridge arm of the high-voltage capacitor is as shown in FIG. 2. According to FIG. 2(a) and the Kirchhoff's law, we can get $$\begin{cases} I_f(s) = I_{f1}(s) + I_{f2}(s) = I_{T1}(s) - I_{T3}(s) \\ I_{T2}(s) = \frac{I_{T3}(s)}{2} + I_{f1}(s) \\ \left[\frac{1}{2sC} + Z(s)\right] I_{T3}(s) = \frac{1-\lambda}{sC} I_{f1}(s) \\ \frac{\lambda}{sC} I_{f2}(s) = \frac{1}{sC}[I_{T2}(s) + I_{T3}(s)] + Z(s) I_{T3}(s) \end{cases} \quad (1)$$

Where, $I_f(s)$ is fault current flowing through the current transformer $C_{T3}$.

the formula (1) is organized and simplified, and inverse Laplace transform is carried out, we can get $$\begin{cases} i_f(t) = i_{f1}(t) + i_{f2}(t) = i_{T1}(t) - i_{T3}(t) \\ i_{T2}(t) = \frac{\lambda}{2} i_f(t) \end{cases} \quad (2)$$

The currents $i_{f1}$ and $i_{f2}$ only flow through the capacitive element, and it can be considered that the fault current $i_f$ flows through the equivalent capacitance $C_{eq}$. Combined with the above analysis, the DC filter is simplified and equivalent to the parallel form of impedance $Z_{eq}$ and capacitance $C_{eq}$, and the grounding fault time domain equivalent circuit of the upper bridge arm of the high-voltage capacitor is obtained, as shown in FIG. 2(b).

According to FIG. 2(b), the voltage u(t) and the current $i_f(t)$ have the following relationship $$i_f(t) = C_{eq} \frac{du(t)}{dt} \quad (3)$$

By combining the formula (2) and formula (3), the calculation formula of virtual capacitance $C_{zd}$ can be obtained as follows:

$$C_{zd} = \frac{\lambda}{2} C_{eq} = i_{T2}(t) \frac{dt}{du(t)} \qquad (4)$$

It can be seen from the formula (4) that the virtual capacitance $C_{zd}$ is proportional to the equivalent capacitance $C_{eq}$, and the ratio between the two is $\lambda/2$; when a grounding fault occurs at the upper bridge arm $f_1$ of the high-voltage capacitor, the current $i_{T2}$ measured by an unbalanced transformer $C_{T2}$ and the head voltage u of the DC filter can be calculated in real time to obtain the virtual capacitor $C_{zd}$; if the parameters of the DC filter are fixed, the value of the virtual capacitor $C_{zd}$ depends only on the location of the fault point and has nothing to do with the operation mode of the DC system.

The grounding fault equivalent circuit of the lower bridge arm of the high-voltage capacitor is shown in FIG. 3. Similarly, the calculation formula of virtual capacitance $C_{zd}$ can be obtained as follows:

$$C_{zd} = \frac{1-\varphi}{2} C'_{eq} = i_{T2}(t) \frac{dt}{du(t)} \qquad (5)$$

It can be seen from the formula (5) that the virtual capacitance $C_{zd}$ is proportional to the equivalent capacitance $C'_{eq}$, and the ratio between the two is $(1-\varphi)/2$; after a grounding fault occurs at a point $f_2$ at the lower bridge arm of the high-voltage capacitor, current $i_{T2}$ measured by the unbalanced transformer $C_{T2}$ and the head voltage u of the DC filter can be calculated in real time to obtain the virtual capacitor $C_{zd}$; if the parameters of the DC filter are fixed, the value of the virtual capacitor $C_{zd}$ depends only on the location of the fault point and has nothing to do with the operation mode of the DC system.

When the high-voltage capacitor normally operates, the voltage across the two ends of the unbalanced bridge of the high-voltage capacitor $C_1$ is always the same, and the theoretical value of the current measured by the unbalanced current transformer $C_{T2}$ is 0, and is not affected by the operation mode of the DC system. Therefore, the theoretical value of the virtual capacitance $C_{zd}$ is 0 when the high-voltage capacitor normally operates.

Although the specific examples of the invention are described in combination with specific examples above, they are not intended to limit the scope of protection of the invention. It is to be understood by those skilled in the art that various modifications or variations made by those skilled in the art without creative work are still within the protection scope of the invention.

What is claimed is:

1. A grounding fault protection method for a high-voltage capacitor of a direct-current filter, comprising the following steps:
   (1) collecting the head-end voltage u and unbalanced current $i_{T2}$ of the DC filter, and obtaining the discrete head-end voltage and unbalanced current sequence $$\begin{cases} u = \{u(1), u(2), \ldots, u(j), \ldots, u(N)\} \\ i_{T2} = \{i_{T2}(1), i_{T2}(2), \ldots, i_{T2}(k), \ldots, i_{T2}(N)\} \end{cases},$$

wherein j and k, valued as 1, 2, . . . , N, are positive integers, and N is a number of total sequence points;
   (2) calculating the virtual capacitance $C_{zd}$ with a calculation formula as follows:

$$C_{zd} = \frac{\sum_{k=1}^{N_T} |i_{T2}(k)|}{\sum_{j=1}^{N_T} |u(j+1) - u(j)|}$$

wherein, $N_T$ is a number of total sampling points within a time window;
   (3) determining a protection setting value $C_{set}$ according to the bridge arm capacitance of the high-voltage capacitor, and when the virtual capacitance $C_{zd}$ is larger than the protection setting value $C_{set}$, protecting and judging to be an internal fault; otherwise, protecting and judging to be an external fault.

2. The method according to claim 1, wherein the calculation formula of the protection setting value $C_{set}$ is as follows:

$$C_{set} = k_{set} C$$

$k_{set}$ is a setting value of protection action, and $k_{set}$ is 0.001-0.05.

* * * * *